May 21, 1940. E. G. STRECKFUSS 2,201,355
TIME RECORDER
Filed Dec. 13, 1933 8 Sheets-Sheet 1

FIG.1.

INVENTOR.
ELMER G. STRECKFUSS.
BY
ATTORNEYS.

FIG. 2.

May 21, 1940.　　　E. G. STRECKFUSS　　　2,201,355
TIME RECORDER
Filed Dec. 13, 1933　　　8 Sheets-Sheet 4

FIG. 4.

INVENTOR.
ELMER G. STRECKFUSS.
ATTORNEYS.

FIG. 5.

INVENTOR.
ELMER G. STRECKFUSS
ATTORNEYS.

INVENTOR.
ELMER G. STRECKFUSS.
BY
ATTORNEYS.

May 21, 1940.  E. G. STRECKFUSS  2,201,355
TIME RECORDER
Filed Dec. 13, 1933  8 Sheets-Sheet 8

INVENTOR.
ELMER G. STRECKFUSS.
BY
ATTORNEYS.

Patented May 21, 1940

2,201,355

UNITED STATES PATENT OFFICE 2,201,355

TIME RECORDER

Elmer G. Streckfuss, Cincinnati, Ohio, assignor to The Cincinnati Time Recorder Company, Cincinnati, Ohio, a corporation of Ohio Application December 13, 1933, Serial No. 702,177

23 Claims. (Cl. 101—96)

My invention relates to time recorders and more especially to such recorders in which the record is stored in the apparatus.

One object of my invention is to imprint a record element such as a sheet or card, for any purpose, with a designation of the time of an incident which is indicated by or which is recorded on the record element.

A further object is to imprint such a record element with the time of day preferably in hours, minutes and fractions of minutes, and also with a designation of the day, and the part of the day, as the forenoon or afternoon.

A further object is to effectively prevent imprinting the element with a designation of any time earlier than the time of the incident or transaction.

A further object is to prevent operation upon more than one original record element at a time.

A further object is to prevent withdrawal of the record element after operation of the recorder is started.

A further object is to store or file the accumulated record elements in the order of their imprinting.

A further object is to compel complete imprinting and record element storing or filing operation of the machine.

A further object is to allow removal of the stored or filed record elements and to afford a strict account of access to the machine for such removal.

A further object is to prevent unauthorized access to the time control mechanism or the printing mechanism or the storing or filing mechanism.

A further object is to prevent operation of the printing and storing or filing mechanism while access to the mechanism of the machine is permitted.

Broadly as a means of accomplishing the above objects my invention comprises a clock device and printing wheels set by the clock device to print a designation of the time according to the running of the clock device; a device to receive the record element or card and hold it in imprint receiving relation to the printing wheels; a device to interpose ink between the printing wheels and the held record element; a device to bring about printing contact of the printing wheels and the ink and the record element; a device to obstruct entrance of a succeeding record element or card, after initiation of the printing contact movement; a device to minimize the interval of the printing contact; a device to engage the record element or card for tractive action thereon; a device to impel the tractively engaging means to remove the record element or card from printing position; a device to release the record element or card from the tractive means and to impel it away therefrom; a receptacle or filing device to receive the record element or card when impelled away from tractive means which comprises means to prevent return of the record elements or cards through the entrance to the receptacle or filing means, and which has an opening for removable of the accumulated record elements or cards therefrom; an enclosure for the clock device and the entire mechanism including the devices above mentioned, which enclosure is provided with an opening for insertion of the record elements or cards, and with primary actuating means accessible outside thereof, and a door opened for access to the receptacle or filing device for removal of the record elements, which door is provided with a lock; and further an accounting device operated incident to the movement of the door at each access; and also a stop set by the opening of the door to obstruct operation of the mechanism.

Objects additional to those above mentioned, as well as more specific details of construction will be set forth in the following description illustrated by the accompanying drawings, in which.

As I prefer to construct my improved time recorder, a base 1 has two front posts 2 and a rear post 3 upstanding therefrom. A frame is supported on these posts comprising side members with upper middle parts 4 and 4a, lower middle outwardly offset parts 5 and 5a, front extensions 6 and 6a, connected by a cross piece 7, which rests on the post 2 and rear extensions 8 and 8a connected by a cross piece 9, which rests on the rear post 3.

Clock control mechanism

A top front shaft 10 and a top middle shaft 11 are journaled transversely in the upper middle parts 4 and 4a of the frame and serve to support respectively the printing device and the intermediate transmission device of this mechanism; which is operatively connected to the clock device by primary transmission means.

*Primary transmission.*—To the rear and somewhat below the horizontal plane of the top shafts 10 and 11, is the rear shaft 12 journaled in the frame rear extension 8 and in a bracket 12a. A clock 13 which as herein illustrated is an electrical clock, is supported on the frame member 8 by supporting means 14, which also support a plate 15, on which are mounted terminal connections 16 of the electrical clock, with wires 16a leading from the clock coils to these connections; and a cable 17 leads from the connections 16 to the exterior of the apparatus as later will be described.

Figure 1:
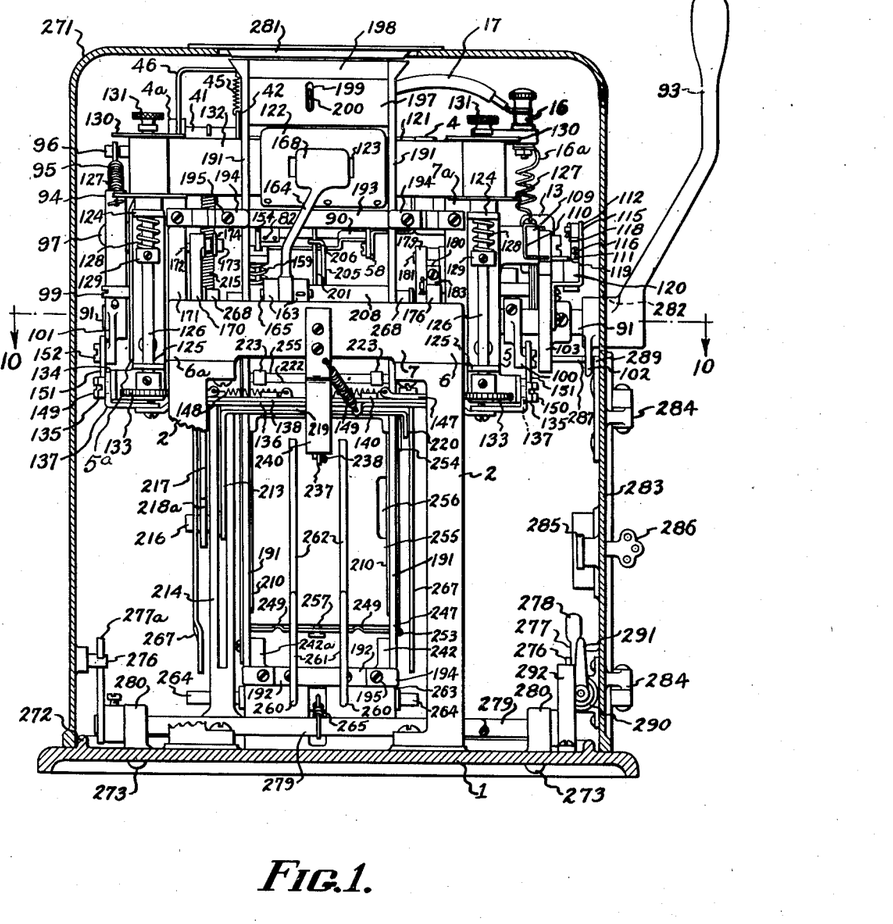
Figure 1 is a front elevation with the base and casing in vertical cross-section.
Figure 2:
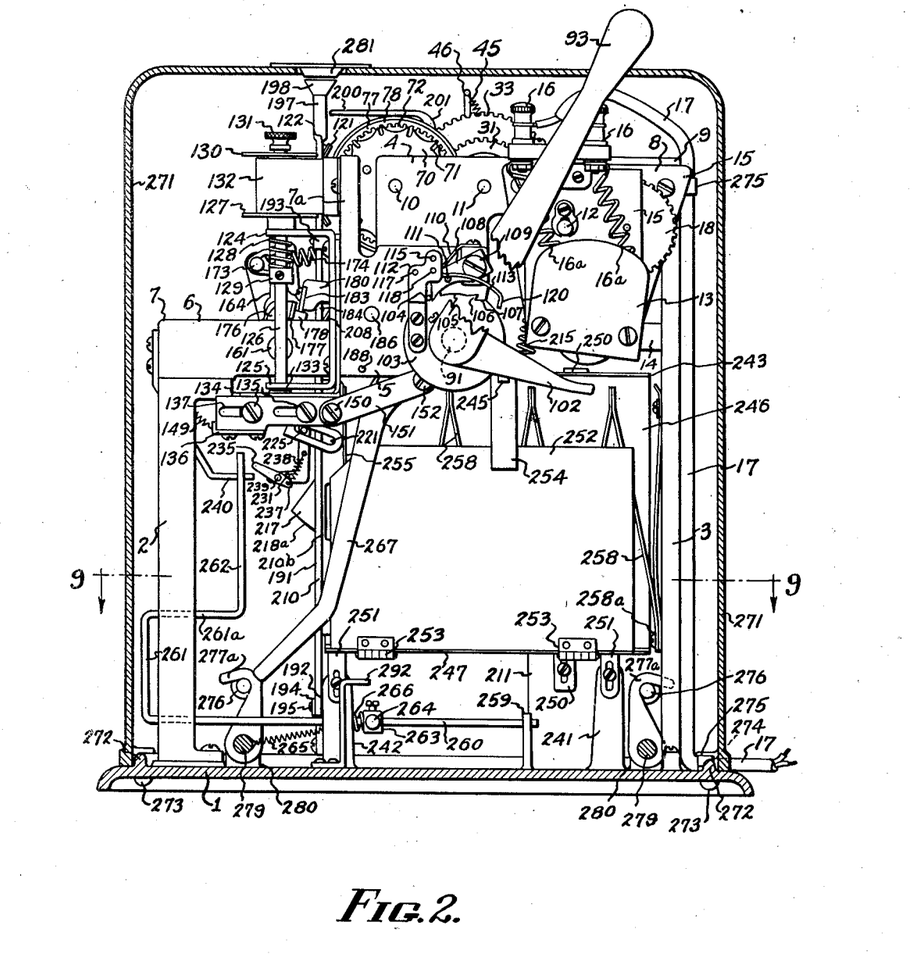
Figure 2 is an elevation of the operator's side of the apparatus, that is, looking to the left in Figure 1, with the base and casing in vertical front to rear section.
Figure 3:
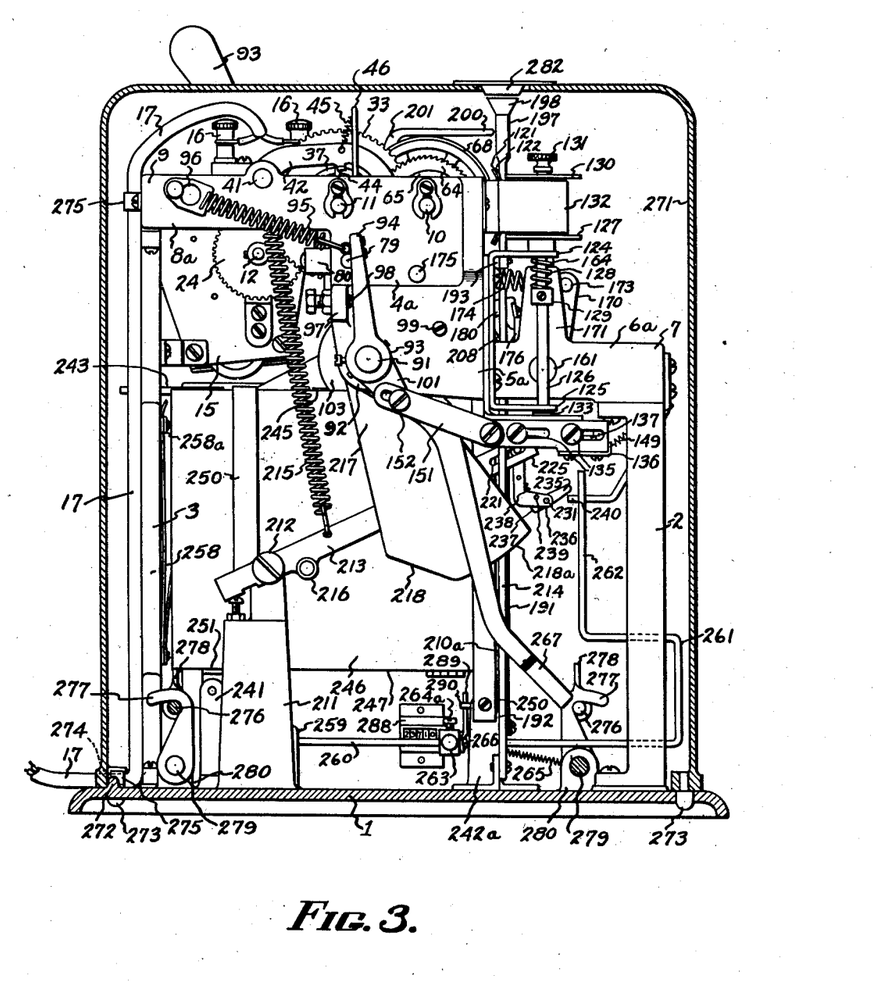
Figure 3 is an elevation of the opposite side of the apparatus, that is, looking to the right in Figure 1, with the base and casing in vertical front to rear section.
Figure 4:
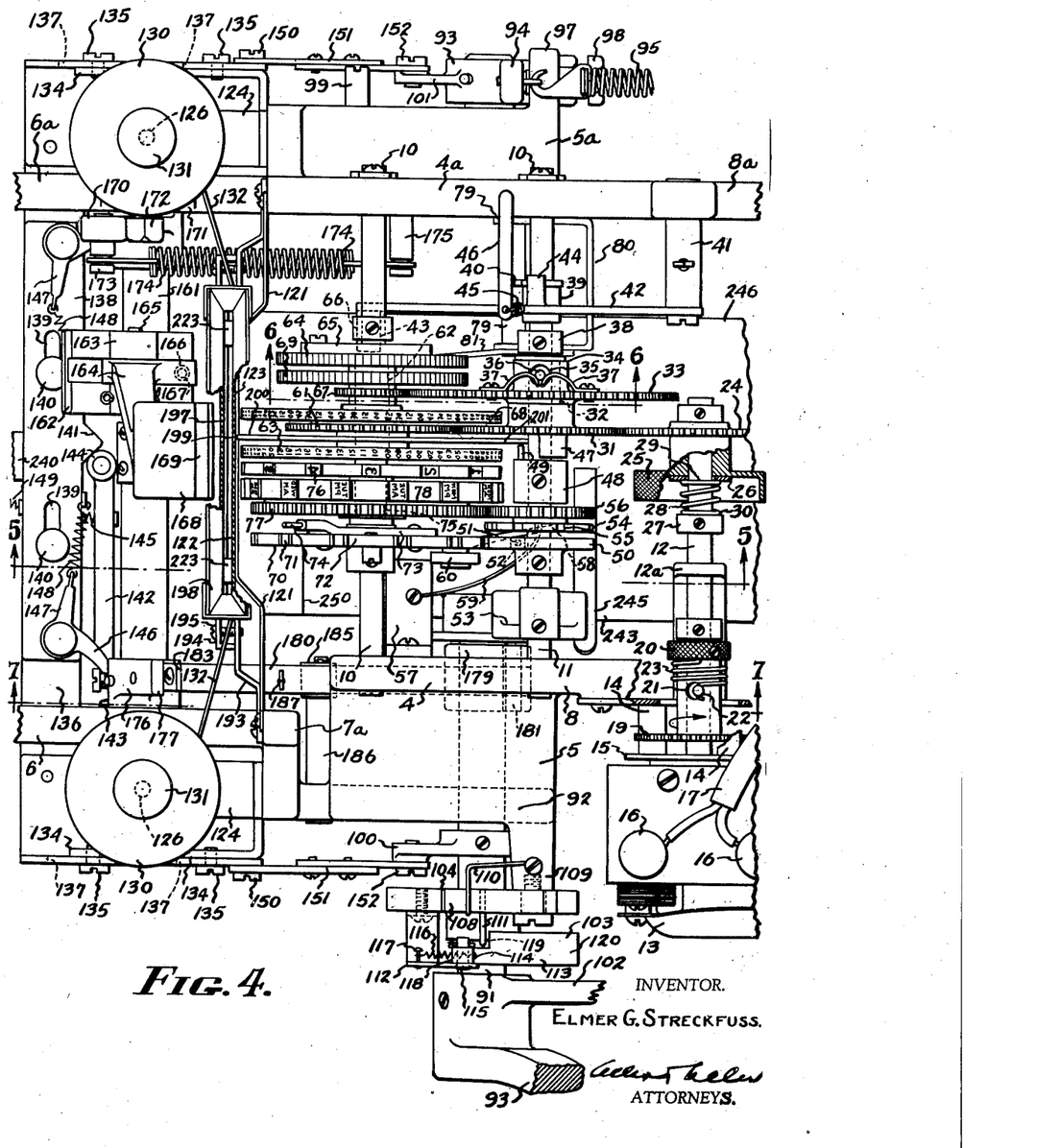
Figure 4 is a partial plan view with the operator's side of the apparatus at the bottom of the view and with the base and casing omitted.
Figure 5:
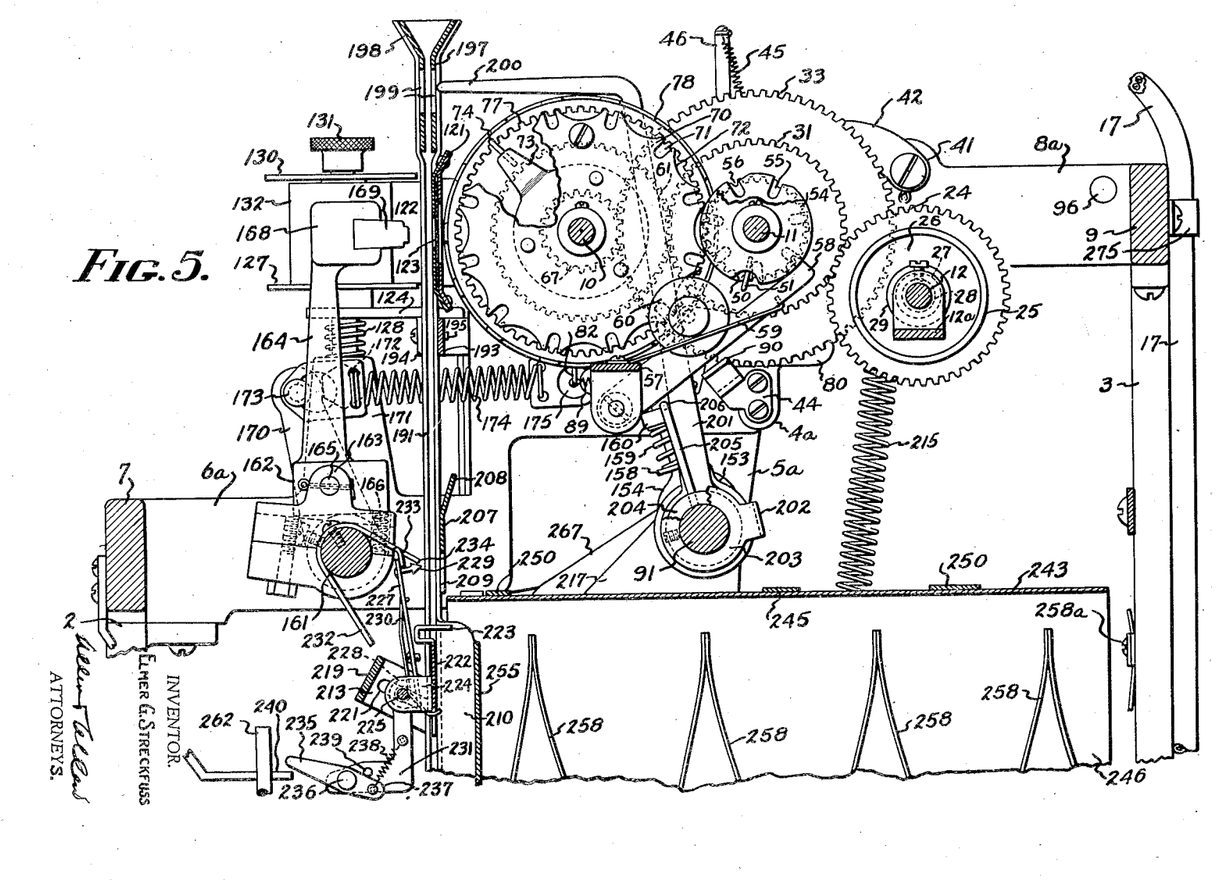
Figure 5 is a front to rear vertical section on the line 5—5 of Figure 4.

Supported along with the clock 13 is a speed reducing gear train 18, operatively connecting the clock to the rear shaft 12. The final gear 19 of this train is loose on the shaft 12 to turn over to the rear, that is, to the right in Figure 4. This gear 19 has a hub with a collar 20 tight thereon; and the hub has an opening 21, while the rear shaft 12 on which the gear 19 and hub turn loosely, has a pin 22 extending out through the opening 21, considerably smaller in diameter than the opening; thereby forming a lost-motion connection between the gear 19 and the shaft 12. This connection is supplemented by a spring 23 coiled around the hub with its opposite ends connected respectively to the pin 22 and the hub collar 20.

The shaft 12 extends in toward the middle of the machine where it has loosely mounted on it a spur gear 24, with a hub extending toward the clock side of the machine and having its end enlarged to form a knob 25, the periphery of which is knurled to facilitate turning of the shaft 12 by hand. The end of this knob toward the clock is hollow with a friction face 26 surrounding the shaft 12. A collar 27 between this knob and the clock is fixed on the shaft 12 and a spring 28 surrounds the shaft 12 between this collar and the friction face 26, with washers 29 and 30 against the face 26 and the knob 27 respectively. This spring 28 being compressed between these parts causes sufficient friction with the collar and the knob for the shaft 12 to drive the gear 24, under all normal conditions.

*Secondary transmission.*—On the top middle shaft 11 a spur gear 31 is loosely mounted and is equal in diameter to and meshes with the gear 24, frictionally driven by the shaft 12 as just described. This gear 31 has a hub 32 extending toward the opposite side of the machine and a larger spur gear 33 has a hub 34 loose on a reduced part of the hub 32 of the gear 31, with a hole 35 through which a pin 36 projects from the hub 32; this pin being considerably smaller in diameter than the hole to provide a lost motion connection between the two gears 31 and 33. Spring tongues 37 are fixed on the side of the larger gear 33 extending toward each other and having their free ends bent inward toward the gear 33 to form convex bearings against the pin 36, whereby these springs 37 tend to keep the pin 36 midway of the width of the hole 35. A collar 38 tight in the shaft 11 serves to prevent endwise movement of the gears toward the opposite side of the machine.

Beyond the collar 38 a hub 39 is fixed on the shaft 11, with a radial projection 40. On a stud 41 projecting from the frame side rear part 8a is fulcrumed a lever 42 extending forwardly over the hub 39 and then downwardly under the top front shaft 10, where this lever 42 has a lug 43 projecting toward the clock or operator's side of the machine. This lever has another lug 44 on its middle part projecting into the path of the projection 40 on the hub 39 of the shaft 11, in such manner as to detain the shaft 11 from rotating when the lever 42 is lowered so that the projection 40 engages the projection 44. This lever 42 is normally urged upward by an extension spring 45 stretched from it upward to the top part of the standard 46, on the frame part 4a.

Extending from the smaller gear 31 toward the clock side of the machine is a segment 47 which bears against a collar 48 fixed on the shaft 10 to prevent movement of the gears toward the clock or operator's side of the machine; this collar 48 having a pin 49 projecting within the path of rotation of the segment 47, so that after a partial rotation of the gear 31 the shaft 11 will be compelled to rotate therewith by the engagement of the segment 47 with the pin 49. Spaced some distance from this collar 48 toward the operator's side of the machine and fixed on the shaft 11, is a disc 50 with a single notch 51 in its periphery and a pin 52 projecting out in the middle of this notch. Between this disc 50 and the frame part 4, a hub is fixed on the shaft 11 from which hub extends an arm 53 with a weight on its outer end. Between the collar 48 and the disc 50 is a second disc 54 having seven equally spaced notches in its periphery and being concentrically fixed to a small spur gear 56; the disc and the gear rotating together loosely on the shaft 11.

Forwardly and downwardly from the shaft 11 a bracket 57 extends in from the frame part 4, and has pivoted on it a detent pawl 58 which rides on the periphery of the disc 54 and is adapted to enter any one of the notches 55 thereof; being held to the disc by a spring 59 mounted on the bracket 57. On the middle upwardly extended part of this detent pawl 58 a roller 60 is mounted upon a horizontal axis.

*Printing wheels and connections.*—About midway of the length of the top front shaft 10 a spur gear 61 is journaled loosely thereon with a hub 62 extending toward the opposite side of the machine. This gear 61 is equal in diameter to and meshes with the smaller gear 31, on the rear top shaft 11 before described. Fixed concentrically to this gear 61 but spaced therefrom toward the operator's side of the machine is the minute printing wheel 63; and fixed to the end part of the hub 62 of this gear 61 toward the opposite side of the machine is the ratchet wheel 64. On the outer side of this wheel 64 is fixed a cam 65 with its periphery in the shape of a spiral rise terminating in an abrupt drop 66. This cam periphery is engaged by end lug 43 of the lever 42 before described, so that the lever is depressed by the spiral rise portion and is allowed to swing upward by action of the spring 45 when the lug 43 reaches the drop 66.

Loosely turning on the hub 62 of the gear 61 is the pinion 67 meshing with a larger gear 33 on the shaft 11 before described; and fixed on this pinion 67 concentric therewith is the fractional-minute printing wheel 68. As here shown this wheel 68 is provided to print designations of quarter parts of the minute; and the pinion 67 is accordingly of diameter one-fourth that of its meshing gear 33. At the other side between this pinion 67 and the minute ratchet wheel 64 is the ratchet wheel 69 for the fractional minute wheel 68; being fixed concentric to this wheel and its pinion 67. The two ratchet wheels 64 and 69 are of the same diameter and have the same number of teeth.

Turning loosely on the shaft 10 near the operator's side of the machine, is the hour printing wheel driving disc 70, having in its periphery 12 equally spaced notches 71 alternating with concave portions 72, any one of which is adapted to have a locking bearing against the periphery of the single notched disc 50; while the pin 52 in the notch of this disc 50 is adapted to engage in any one of the twelve notches of the wheel 70, with the portions at the sides of the notches entering the notch 51 of the disc 50. These parts thus constitute a form of Geneva movement. An arm 73 is fixed on the side of this disc 70 and has on its end a pin 74 adapted to engage in any one of the seven notches of the other disc 54 on the shaft 11. On the hub 75 extending from the disc 70 toward the opposite side of the machine is fixed the hour printing wheel 76. Loosely mounted on the hub 75 between the printing wheel 76 and its disc 70 is a gear 77 meshing with the gear 56 that turns with the disc 54 on the shaft 11 as before described. The fractional day printing wheel 78 is fixed concentric with the gear 77 turning therewith loosely on the hub 75. As here shown this printing wheel bears designations of the forenoon and afternoon of each day of the week; making fourteen designations; and accordingly since the disc 54 has only seven notches, the gear 77 has twice the diameter of the gear 56 that turns with the seven-notched disc 54.

Projecting in from the opposite frame side part 4a is a stud 79, on which is pivoted a yoke 80 carrying the time wheel setting arm 81 which extends forward and has an upturned sharp edged part 82, wide enough to engage the teeth of both ratchet wheels 64 and 69, and thereby, due to the slanting sides of the ratchet teeth adapted to bring both ratchet wheels to a definite position, and accordingly set the respective minute and fractional minute printing wheels in definite positions with their printing characters aligned for printing; whichever characters happen to be nearest to this definite position at the time of action of the setting arm 81.

This setting arm 81 carries a pivot 83 on which are pivoted pawls 84 and 85 engaging the respective ratchet wheels 64 and 69. Each pawl has a downwardly extending arm 86 or 87 connected by an extension spring 88 or 89 to a portion of the setting arm; these pawls clicking over the ratchet wheel teeth and limiting return rotation of the printing mechanism and the transmission device thereof. The time wheel setting arm 81 has an extension 90 over toward the operator's side of the machine under the detent pawl 58 of the seven-notched disc 54; having a projection to engage in any one of the notches 55 of this disc to definitely set the fractional day printing wheel at the time of setting of the minute and fractional minute printing wheels as above described.

*Actuating device and connections*

The main operating shaft 91 is journaled transversely in bearings 92 in the lower middle frame member 5 and 5a; and at the operator's side of the machine has fixed on it the handle lever 93 extending upward. At the opposite side of the machine this shaft 91 has fixed on it a lever with an upwardly extending arm 94, the upper end of which has an extension spring 95 extending rearwardly and connecting it to a stud 96 in the frame part 8a. A lug 97 extends from the frame part 5a in back of this arm 94 and has in it a stop screw 98 which may be adjusted to determine the extent of rearward rotation of the operating shaft 91. Forwardly a stop 99 extends from the frame part 5a to limit the forward rotation of this shaft 91. At the operator's side between the handle lever 93 and the frame, an arm 100 is fixed on the shaft 91 and extends downwardly and forwardly; and the lever having the arm 94 at the opposite side has an arm 101 extending in the same direction. On the hub of the handle lever 93 an arm 102 extends downwardly and rearwardly.

Fixed on the main operating shaft 91 between the handle lever 93 and the arm 100 is the anti-return ratchet disc. The upper portion of the periphery of this disc is formed with a forward tooth 104 having a forwardly and downwardly inclined front side and a radial rear side. The portion 105 of this periphery to the rear of the tooth 104 is concentric with the shaft and to the rear of this portion is a tooth 106 like the front tooth 104; and in back of this tooth 106 is a downwardly and forwardly inclined portion 107. The pawl 108 extends downwardly and forwardly from its pivot 109 on an extension of the frame part 4; this pawl being yieldingly held against the disc periphery by a spring 110 mounted on the pivot extension; and the pawl having near its front end a pin 111 extending laterally outwardly therefrom. A bracket 112 extends up from the side of the front part of the disc 103. The pawl lifter 113 has an upturned front end 114 connected by a pivot 115 to the bracket 112; and a spring 116 connects the lifter to a stud 117 on the bracket 112 so as to yieldingly swing the lifter down against a stop 118 in the bracket. The inner edge portion of this lifter 113 presents a front end 119 in the path of the pawl pin 111, which end is upwardly and forwardly beveled on its lower side; and the rear end 120 of this lifter is curved downwardly.

The parts just described are so arranged that with the handle lever 93 inclining rearwardly as shown, the end of the pawl 108 lies on the front inclined side of the tooth 104. As the lever 93 is swung forward the pawl rides up this incline and drops to the surface 105 in back of the tooth 104 so that the abrupt rear side of the tooth would now prevent backward swing of the lever. As this occurs the pawl lifter front end 119 rides to the top of the pawl pin 111. During further forward swing of the lever 93, the pawl rides on the concentric part 105 and the lifter 113 rides on the pin 111. In the end part of the forward swing of the lever 93 the pawl rides up on the front incline of the tooth 106 and in doing so its pin 111 lifts the lifter 113, and this lifting is continued due to the engagement of the pawl pin 111 with the under side of the bent down rear end part 120 of the lifter; so that by the time the pawl drops in back of the tooth 106 and has ridden partly up the incline 107, the raised lifter 113 will drop its rear end from the pawl pin 111. Now upon return rearward swing of the lever 93 the pawl is lifted by its pin 111 riding up the top of the bent down part 120 of the lifter and riding along the top of the lifter until when the lever has again reached its rearward position, the lifter bringing its front end part 119 backward past the pin 111 allows the pawl again to drop into its initial position against the front incline of the front tooth 104.

*Printing and card disposal mechanisms*

*Ribbon mechanism.*—The ribbon guide rear plate 121 is mounted transversely on the front of the frame part 4a and the front of an upstanding lug 7a on the frame part 4; and the ribbon guide front plate is bent up from the bottom of the rear plate and the two planes are spaced to allow the ribbon to pass between them and have registering slots 123 at their middle portions. Below these plates on the fronts of the frame parts 4 and 4a are side brackets each with an upper bearing 124 and a lower bearing 125 for a respective vertical shaft 126. These shafts carry ribbon spools 127 above the upper bearing 124 and helical springs 128 around these shafts between the lower bearings 124, and collars 129 fixed on the respective shafts retard the rotation of the spools by friction with the tops of the upper bearings 124. The spools have removable top flanges 130 held by thumb nuts 131 on the upper ends of the shafts 126; and the ribbon 132 wound on these spools passes between the guide plates 121 and 122 as before mentioned.

Below the lower bearings 125 ratchet wheels 133 are fixed on the respective shafts 126. Supporting arms 134 lie outward from these ratchet wheels; being supported on the frame by extensions up between the ribbon spool bearing brackets and the respective frame parts; and in each support arm are two guide screws 135. The transverse pawl frame 136 has upstanding ends outside the arms 134 with slots 137 receiving the respective screws 135 so that this frame 136 may slide forwardly and rearwardly on the arms 134. Extending transversely along the top of and supported on the pawl frame 136 is the pawl carrier 138 with longitudinal slots 139 receiving studs 140 projecting up from the pawl frame with heads holding the pawl carrier down to slide transversely on this frame. The middle of the rear edge of this frame has the triangular rearward projection 141; and a detent lever 142 is pivoted at 143 to swing forwardly and rearwardly on the pawl frame and has on its free end a roller 144 engaging the projection 141 by the force of an extension spring 145 stretched from the detent lever to the front side of the pawl frame. The effect of this arrangement is to cause the pawl carrier to move quickly to one side or the other of the machine once it is pushed in either direction past mid-position and then to be held there by the lever 142. Pawls 146 are pivoted on the pawl frame to engage the respective ratchet wheels 133, which wheels have their teeth pitched oppositely; the pawls being held to the wheels by having arms 147 connected by extension springs 148 to lugs on the pawl carrier. A spring 149 stretched from the pawl frame forwardly and connected to the front frame part 7, yieldingly holds the pawl carrier in its forwardmost position.

The rear ends of the upturned sides of this pawl carrier have pivots 150 connecting them to respective links 151, which extend rearwardly and upwardly and have their rear ends connected by pivots 152 to the front ends of the arms 100 and 101 of the actuating shaft 91. The relative position of the arms and links is such that there is considerable forward rotation of the actuating shafts 91 before there is any appreciable rearward sliding of the pawl frame; so that feeding of the ribbon by the action of the pawls on the ratchet wheels in this rearward sliding is considerably delayed.

Figure 6:
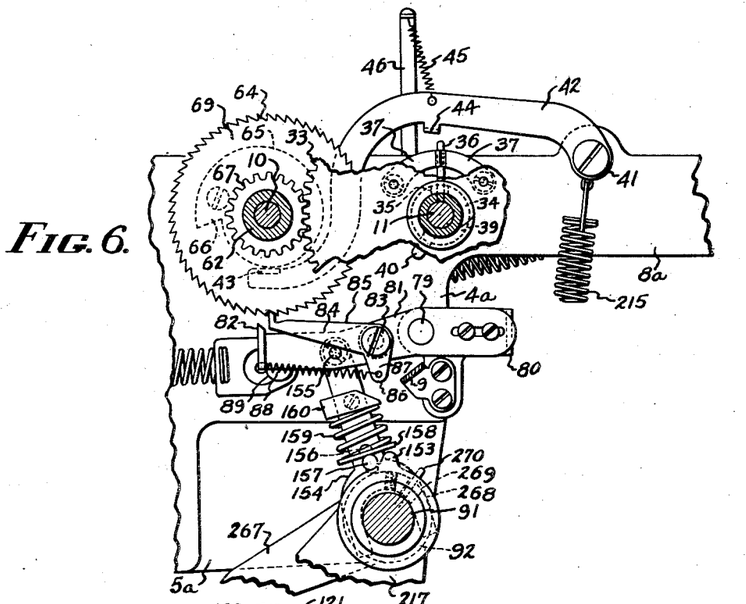
Figure 6 is a partial similar section on the line 6—6 of Figure 4.
Figure 7:
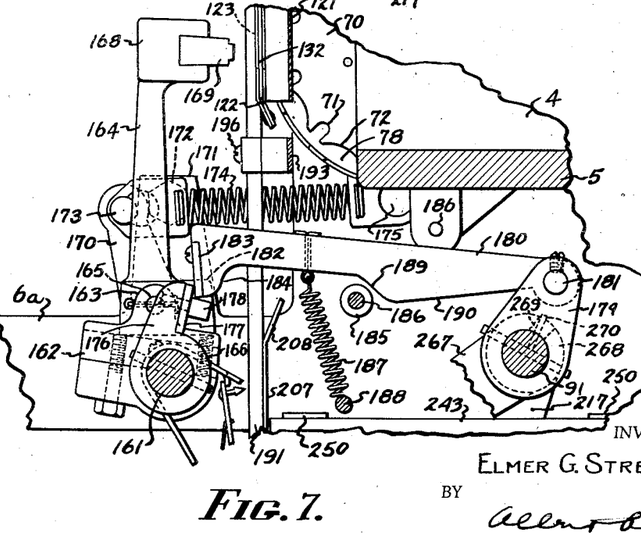
Figure 7 is a partial similar section on the line 7—7 of Figure 4.
Figure 8:
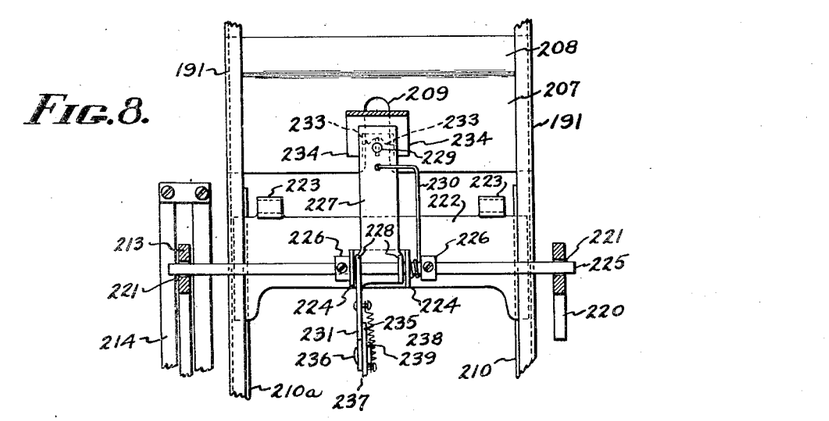
Figure 8 is a partial detailed front elevation illustrating the card pull-down device.
Figure 9:
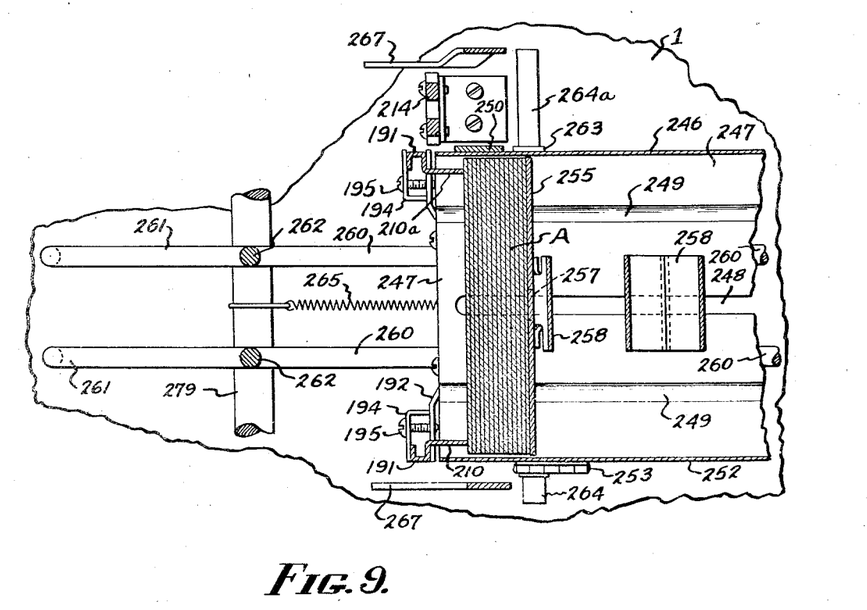
Figure 9 is a partial horizontal cross-section on the line 9—9 of Figure 2.
Figure 10:
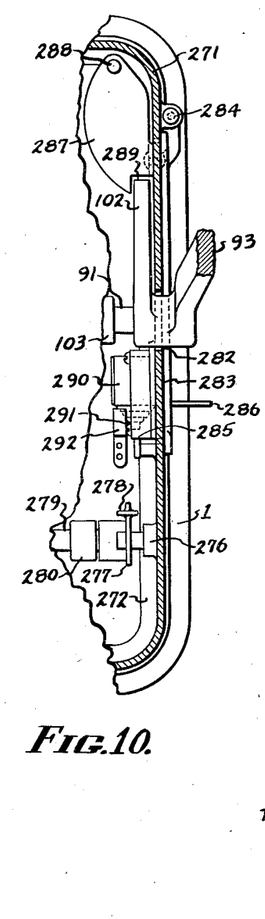
Figure 10 is a partial horizontal section of the operator's side of the machine on the line 10—10 of Figure 1.

The main operating shaft 91, as is best shown in Figure 6, carries a device by which it sets the printing wheel setting device that comprises the setting arm 81 as before described. This device comprises a pair of setting cams fixed on the shaft 91 with upwardly presented aligned noses 153. These cams are spaced apart and between them a forked link 154 straddles the shaft 91 and has its upper end pivoted at 155 to the setting arm 81. Near the cams this link has a longitudinal slot 156 transversely through which extends a roller pin 157 in the paths of the cam noses 153. A washer 158 lying on the pin 157 receives one end of a compression spring 159 coiled around the link and having its upper end against a block 160 fixed on the link.

The result is that on forward rotation of the shaft 91 the cam noses 153 act through the pin 157 and the spring 159 on the link 154 to raise the setting arm 81 bringing its front end part 82 against the teeth of the ratchet wheels 64 and 69 to cause alignment of the printing wheels as previously described.

*Printing impression mechanism.*—The lower front shaft 161 is journaled transversely in the front frame extensions 6 and 6a; and near its middle it has fixed on it the hammer carrying block 162 having upstanding bearings 163 in which the upstanding hammer lever 164 has a transverse pivot 165. This lever 164 has a rear projection engaging a spring 166 in the front part of the block 162. On the upper end of the lever is the hammer head 168 with a transverse slot in its rear side in which is gripped a facing piece 169 preferably of rubber.

A lever 170 is fixed on the shaft 161 upstanding adjacent an upstanding lug 171 on the frame part 6a which has a stop projection 172 engaged by the upper end of the lever 170 limiting rearward rotation of the shaft 161. Connected to a stud 173 in the lever 170 is an extension spring 174 stretched backwardly to a stud 175 in the frame part 4a.

Adjacent to the opposite frame part 6 an arm 176 is fixed on the shaft 161 extending upwardly and having on its rear side a hardened contact plate 177 and a rearwardly projecting stop lug 178 spaced down from the upper edge of this plate. A forked arm 179 is fixed on the main actuating shaft 91 and between its members is the rear end of the push bar 180 pivoted therein by a pin 181. This bar 180 has a depending front end part 182 with a hardened contact plate 183 on its front; the rear side 184 of this depending part 182 being convex. About midway of the length of the arm a roller 185 is mounted therebelow on a stud 186 extending in from the frame part 5. An extension spring 187 is stretched from the push bar 180 down to a stud 188 in the frame part 4; and the lower side of the push bar 180 has a forwardly facing rearwardly, downwardly inclined part 189; and the rear part 190 of the underside of this bar from the part 189 rearwardly is inclined upwardly.

Upon forward rotation of the main actuating shaft 91 the bar 180 pushes forwardly on the upper end of the arm 176, rotating the lower front shaft 161 forwardly. During this operation the forwardly facing part 189 on the bottom of the bar 180 is riding up on the roller 185; so that finally the bar 180 will disengage from the arm 176 upon which the spring 174 acting on the arm 170 will quickly rotate the shaft 161 rearwardly; with the rear concave surface 184 of the front part of the bar 180 riding on the front portion of the top of the arm 176. This sudden rearward rotation swinging is stopped suddenly when the arm 170 engages the stop 172; but due to the momentum of the hammer head 168, the spring 166 is overcome momentarily until the hammer facing 169 strikes the ribbon 132, where it is exposed in the slot 123; so that if a card is between the ribbon and the printing wheels an impression will be made on the card. The printing hammer just as quickly springs forwardly by the reflex action of the spring 166. Further forward rotation of the actuating lever 91 for operation of other parts of the machine as later will be described, results in the push bar 180 riding its bottom rear portion 190 on the roller 185 with a slight rise of the front part of the bar. On return rearward rotation of the main actuating shaft 91 the bar 180 will again ride downwardly and when the rearward rotation is completed it will drop its plate 183 again in back of the plate 177 of the arm 176 to rest on the stop lug 178, ready for a succeeding printing operation.

*Card guide and guard mechanism.*—Extending vertically from the top of the machine down close to the base thereof just in front of the ribbon guide members 121 and 122, and equally spaced from opposite sides of the slot 123 thereof are the channels 191 with their open sides facing toward each other. The lower ends of these channels 191 are fixed together by a bottom cross-bar 192, and they are also fixed together just below the ribbon guide by a top cross-bar 193 which extends out at each side and is fixed to the frame portions 7a and 4a. These channels are preferably fixed to their supporting cross-bars by lugs 194 extending laterally outward from the channels with their outer ends bent backward and screws 195 passing through these lugs into the cross-bars, and drawing the channels and the bent outer ends of the lugs tightly against the bars. The upper end portions of these channels are joined together by a wide flat tube 197 having an upwardly flaring entrance 198 at its top. The crosswise parallel walls of this tube have slots 199 in front to rear alignment. The entrance guard comprises a lever with a top forwardly extending part 200 positioned to pass through the slots 199 and a rear downwardly extending part 201 embracing the main actuating shaft 91 and having to the rear thereof a lateral extension 202, which has a forward extension 203 also embracing the shaft 91. A hub 204 fixed on the shaft 91 between the two shaft embracing portions of this lever has an upstanding arm 205, the upper end part 206 of which is bent transversely to lie in front of the downwardly extending part 201 of the entrance guard lever so that as the hub rotates rearwardly with the shaft 91, this part will push the lever rearwardly so that its top part 200 will be withdrawn from the slots 199; or if the hub rotates forwardly with the shaft 91 the lever will be allowed to drop forward by gravity and insert its upper part 200 into the slots 199.

Just below the pusher bar 180 and to the rear of the shaft 161 of the printing mechanism a back support 207 is fixed to the rear sides of the channel 191; and it preferably has its upper edge part 208 inclined rearwardly. This member 207 is to form a back support for the lower end part of the card or record element when it is inserted down in the machine with its lateral edges guided by the channels 194. In the middle of its lower edge this support 207 has a downwardly opening slot 209. Farther down and extending for a considerable distance down along each channel, flanges 210 and 210a extend rearward from the rear rims of the channels. The flange 210 which is toward the operator's side of the machine has about midway of its length in its rear edge a rearwardly opening slot 210b.

*Card transfer mechanism.*—The rear part of the base 1 has a pedestal 211 upstanding therefrom near its side opposite the operator's side; this pedestal supporting a pivot for the transfer lever 213, which in its inoperative position extends forwardly and upwardly from the pivot and has its forward end part guided in the vertical slot of a guide member 214, upstanding from the base 1 alongside the card guide channel 191 at that side of the machine. An extension spring 215 is stretched from this lever up to the stud 41 in the frame part 8a. Just forward from its pivot 212 this lever 213 has a roller 216 extending outward from it. A cam for operating this lever 213 comprises a sector 217 fixed by a hub on the main actuating shaft 91 and extending downwardly. The lower end of this sector has a rear part 218 inclined rearwardly and upwardly with respect to the arc in which the end of the segment swings and a front part 218a which conforms to this arc; the part being so proportioned and arranged that as the sector 217 swings downward and rearwardly, the inclined part 218 will engage the roller 216 swinging the transfer lever 213 downwardly until when the front part 218a reaches the roller 216 the transfer lever will be held stationary at its lowest position.

This transfer lever 213 where it extends out past its guide 214 has a front transverse part 219 extending across in front of the card guide channels 191 toward the operator's side of the machine, at which side it has a terminal part 220 extending rearwardly, in the same plane as the main opposite side part of the lever. This rearward extension 220 and the corresponding opposite side part have longitudinal slots 221.

The card support 222 extends transversely between and has its ends guided in the card guide channels 191; and on its upper edge it has extensions bent forwardly then upwardly and then rearwardly to form supports 223 for the lower end of the card which is guided in the channels 191. Extending forward equidistant from the middle of the front of this card support 222 are brackets 224 transversely through which extend a trunnion pin 225 having its end portions extending from a slidable portion in the slots 221 of the transfer lever. At opposite sides of the brackets 224 collars 226 are fixed on this trunnion pin 225. The card pull lever comprises an upper arm 227 extending up from bearings 228 of the lever on the trunnion pin 225, and having a rearwardly extending prong having a sharp rear end just forward from which are upper and lower barbs 229. A spring 230 is coiled around the trunnion pin 225 between one of the collars 226 and the adjacent bracket 224, with which bracket it has one end engaged; and this spring extends up and then transversely to bear rearwardly against the upper part of the upper arm 227 so as to yieldingly urge this arm in a rearward position with its prong in the plane of guidance of a card in the channels 191. This pull lever also comprises a lower arm 231 extending downwardly from its pivotal mounting on the pin 225 and having its lower part extended forwardly. The control member for this pull lever is made up of a flat strip of metal bent to U shape with its sides diverging and fixed astraddle of the shaft 161 that operates the printing mechanism as before described; the sides extending downwardly and rearwardly and the lower side or arm 232 being longer and more downwardly inclined than the upper side or arm. This upper arm has a middle notch in its front end within which detents 233 extend down from the arm; and the portions 234 left at the sides of the notch form rearwardly extending guides. The parts are so proportioned and arranged that when the printing mechanism actuating shaft 161 is in its inoperative position the pull-lever will be held forward against the pressure of its spring 230 by engagement of the detents 233 with the upper end of the lever. These detents preferably are placed close enough together to straddle the prong of the lever and limit any sidewise displacement due to looseness of the bearings. When the shaft 161 is rotated over forwardly to operate the printing mechanism, this upper arm is lifted and its detents 233 release the lever arm 227 upon which the spring 230 urges the arm rearwardly; and at the same time the upswinging lower arm 232 engages the lever arm 227 forcibly swinging it rearwardly for the prong to penetrate a card held in the guides 191 and backed by the support 207; the slot 209 leaving a space for the prong where it passes through the cards. The barbs 229 of the prong passing to the rear of the card the tractive engagement of the pull lever with the card is effectively maintained.

For returning the pull lever to its initial position, mechanism is provided which comprises a finger with an upper arm 235 extending forwardly and upwardly from the fulcrum 236 which this finger has on the front end part of the forwardly extended lower portion of the pull lever lower arm 231. This finger also has the lower arm 237 from which a spring 238 is stretched upward to a fastening on the pull-lever lower arm 231; which spring yieldingly holds the lower arm 237 up against a stop 239 in the forwardly extended part of the pull-lever lower arm 231. Fixed to the middle of the front crosswise frame member 7 and extending downwardly and rearwardly therefrom is the detent bracket 240, the rear end of which extends into the path of the front end of the upper arm 235 of the finger.

The pull-lever having inserted the prong through the card as before described, then is pulled down by the transfer lever 213; sliding down along the guides 191 until the transfer lever reaches its lowest position. The cam sector operating a transfer lever as before described, is fixed on the main actuating shaft 91 in such angular relation to the arm 179 actuating the printing mechanism shaft 161 that the engagement with the card is effected during the printing operation, but the action of the transfer lever is delayed until the printing and the tractive engagement of the card are completed.

As the card carrier 222 descends under the action of the transfer lever 213, the upper arm 235 of the finger engages the detent bracket 240 and yields upwardly and then under the action of the spring 237 springs outwardly again after passing the bracket 240. Then when the card carrier ascends this finger arm 235 will engage the under side of the bracket 240 and as the lower arm 237 of the finger is held by the stop 239, the entire pull lever must swing and thus will withdraw the prong forwardly. The printing actuating shaft 161 having again rotated over backwardly, the upper arm of the control member will be down again and the upper end of the pull lever arm 227 will pass in front of the detents 233, so that the parts will be held ready for the next operation.

Preferably the upper end of the pull lever upper arm 227 is transversely convexed and extends up between the side guide portions 234 so that the lever is guided while being forced backwardly to prevent lateral displacement due to looseness of its bearings.

*Card filing mechanism.*—The base 1 also has a pedestal 241 upstanding near the operator's side at the rear; and near its front the base has two pedestals 242 and 242a. To these front pedestals the bottom cross-bar 192 of the card guide channels 191 is fixed.

A receptacle is provided for receiving the printed cards that have been carried down by the transfer mechanism just before described; and it is mounted on the three pedestals 241, 242 and 242a, just mentioned and upon the opposite rear base pedestal 211 previously mentioned. As here shown this receptacle is in the form of a casing made from a sheet of metal bent into a channel, one side of which forms the casing top 243 which has in the middle of its front edge a slot (not seen in the drawings) aligned with the slot 209 of the card back support 207 before mentioned. At the operator's side this top 243 has a latch clip 245 extending from it. What would be the bottom of the channel forms the vertical side wall 246 of the receptacle at the side opposite the operator's side of the machine; and the remaining side of the channel forms the bottom 247 of the receptacle. This bottom has a median front to rear slot 248 at opposite sides and parallel with which it has upwardly imposed ribs 249. Straps 250 are fixed around the top and closed side of this casing and have their lower ends extending below the casing and slotted with screws through the slots clamping them to the base pedestals 211 and 242a. At the open or operator's side of the casing, lugs 251 extend down from the bottom and have slots with screws through them into the pedestals 241 and 242. The slots are vertical and permit the casing to be adjusted up and down on the pedestals. The open operator's side of the casing has a door 252 connected by hinges 253 to the edge of the bottom 247 so as to swing upwardly for closing the side of the casing; and it has an extension 254 from its top edge to engage the latch 245.

The above described receptacle is so proportioned and located that the rearwardly extending flanges 210 and 210a of the card guide channels 191 before described are spaced only short distances inwardly from the closed door 252, and the opposite side wall 246 respectively of the casing. The purpose of these flanges is to form smooth guides for the lateral edges of the cards when the cards are flexed backwardly out of the guide channels 191 into the receptacle to spring in back of these flanges 210 and 210a. When the cards have reached this position they stand with their bottom edges resting on the ribs 249 for easy sliding.

The backing plate 255 stands up across the interior of the casing. It has a slot 256 in its edge next to the door 252. This slot as well as the slot 210b in the guide channel flange readily admits the fingers for withdrawing cards from the receptacle when the door is opened. This back plate 255 has a clip lug 257 extending down through and engaging under the edges of the bottom slot 248 acting as a guide for the plate and holding it down in the receptacle. This plate 255 is yieldingly urged forward by a spring 258 made up of a series of spring leaves alternately connected at tops and bottoms with its front end connected to the back plate 255, and its rear end connected to the rear post 3 at 258a. Thus as cards are forced into the front of the receptacle as above described, this spring will allow the back plate 255 to yield backwardly yet be firmly pressed to hold the cards compactly bunched between the back plate and the rear edges of the channel plate 210 and 210a.

Under the receptacle or casing just described is the rear middle pedestal 259 on the base 1, having openings into which the rear end portions of the lower front to rear members 260 of the card filing pushers extend and are guided. These members 260 similarly extend through the front pedestals 242 and 242a; and a considerable distance forward from these have upwardly and then rearwardly bent members 261 from the rear ends of which the card engaging members 262 are bent vertically upward. At the rear of the front pedestals 242 and 242a the cross-yoke 263 is fixed to and connects the lower front to rear members 260 of these pushers; and on its opposite ends it has laterally extended round lugs 264 and 264a. An extension spring 265 is stretched from this yoke 263 forwardly to a fastening on the base 1, so that the pusher is yieldingly urged forward. The forward motion of the pusher is stopped and cushioned by short springs 266 coiled around the members 260 between the yoke 263 and the front pedestals 242 and 242a. To slide the card pusher backward operating arms 267 extend downwardly from hubs 268 on the main actuating shaft 91. These hubs are loose on the shaft 91 and have openings 269 through which extend pins 270 fixed in the shaft 91 and of diameter considerably less than that of the openings 269. These openings are so located that when not operating the arms 267 incline forwardly downwardly with the rear edges of the openings 269 engaging the pins 270. These openings are large enough to delay backward swinging of the arms 267 by the shaft 91 until the downward transfer of the card to filing position in front of the filing receptacle is almost completed. Then the pin engaging the front edges of the openings in the hub start swinging these arms 267 backward; and by the time the downward transfer is completed and the transfer mechanism has stopped in its lowered position with the front cam sector part 218a traveling against the transfer lever roller 216, these arms 267 engage the round end lugs 264 of the pusher yoke sliding the pusher backward and forcing the card into the filing receptacle as before described. Upon return movement these pusher operating arms 267 return to their initial positions upon engagement of the pins 270 with the rear edges of the openings 269.

*Enclosure and access control mechanism.*—The entire mechanism which as above described, with the exception of the outer end of the main actuating shaft 91, and the actuated lever 93 thereon, is enclosed in a box shaped casing 271 with four sides and a top and an open bottom. The base 1 has an upstanding flange 272 around near its edges fitting within the bottom rim of the casing 271. This bottom rim also has lugs 273 fitting in openings in the base. These lugs and the flange thus definitely locate the casing on the base. At the back the rim has a recess 274 adjacent to which the base flange 272 is recessed; thus leaving an opening out through which passes the cable carrying the conducting wires for the electric clock 13; this cable passing down along the rear post 3 and being secured at the top to the frame and at the bottom to the base by clips 275.

The casing 271 has on its inside lateral walls near its bottom, lugs 276. Hooks 277 provided with finger extensions 278 are provided to hook over the lugs 276 at the operator's side of the machine and hooks 277a without such extensions are provided to hook over the lugs 276 at the opposite side of the machine; each two hooks 277 and 277a being fixed on a respective shaft 279 journaled transversely in bearing lugs 280 upstanding from the base 1. The front one of these shafts 279 forms the connection of the pusher retracting spring 265 to the base as before described.

In the top of the casing 271 registering with the upwardly flaring top 198 of the card guide is a slot in which fits a plate having a slot with downwardly converging sides 281 serving as a continuation of the flaring top 198 for guidance of cards into the guide structure.

The wall of the casing at the operator's side has a door opening in the top edge of which is a slot 282 through which the main actuating shaft 91 extends. A door 283 has hinges 284 connecting it to the rear edge of the door opening; and the front edge of the door is provided with a lock 285 having a key 286; the bolt of the lock engaging inside the front edge of the door opening. At the top of the door next to the top hinge is a segment 287 extending inwardly and having upstanding thereon a stop lug 288 which engages inside the edge of the top of the door opening and limits the opening swing of the door to about 90 degrees. Next to the door the segment has a notch 289; and when the door is closed the rearwardly extending arm 102 on the main actuating shaft 91 can swing freely up through this notch from below the segment 287 to start the hand lever 93 forward for operating the machine; but if the door is open even slightly, this arm 102 cannot swing up past the segment 287 and it will be impossible to operate the machine.

Although the door is locked and the key 286 is possessed by the person desiring control of its operation, I provide for detection of surreptitious opening of the door by a counting device 290 mounted on the door and providing in the path of the operating lever 291 of this counting device a bracket 292 upstanding from the base 1; so that when the door has been opened the necessary subsequent closure of it will result in the operation of the counting device by means of which the authorized person may detect such opening of the machine.

Figure 11:
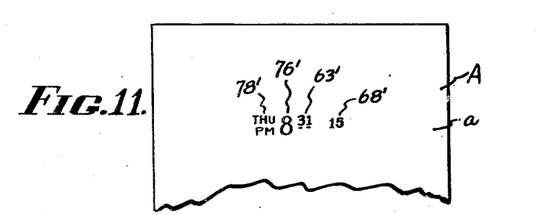
Figure 11 is an illustration of the upper end part of the card showing the time designation imprinted thereon.

In Figure 11 the upper part $a$ of one of the cards A is shown with the imprint of the machine thereon, comprising the day of the week and the part of the day at 78', the hour at 76', the minute at 63' and the part of the minute at 68'. The marking exemplified thus dates the card at eight thirty-one and one quarter in the afternoon of Thursday. These imprints 78', 76', 63' and 68' are printed by the printing wheels 78, 76, 63 and 68, set under the control of the clock 13 hereinbefore described.

Figure 12:
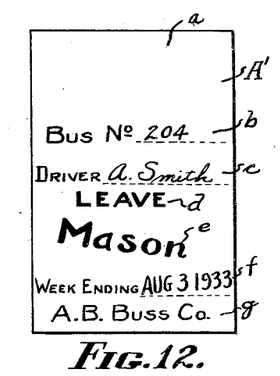
Figures 12 and 13 respectively illustrate two cards used according to my invention for recording the travel of a common carrier, such as a bus.
Figure 13:
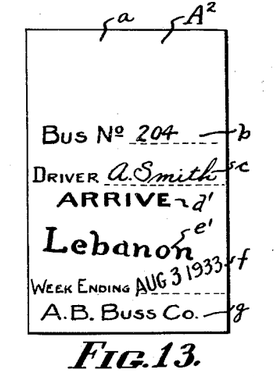
Figure 14:
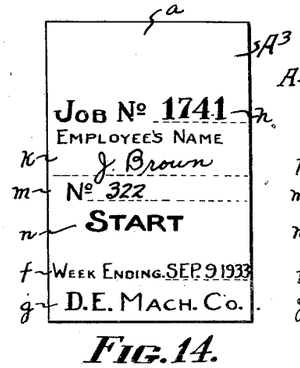
Figures 14 and 15 are respectively views of cards used according to my invention for keeping account of the time expended by an employee on a job of work.
Figure 15:
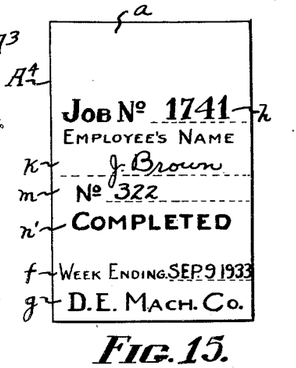

In Figures 12 and 13, two cards A' and A² are shown for use with my machine in recording the travel of a bus; the first card A' for example being printed with spaces for indicating the bus number, the driver's name and the date of ending of the week in which the card was used; and also being printed with the word "Leave" at $d$ and also at the bottom the name of the bus company at $g$. This card is made up with the bus number at $b$, the driver's name at $c$ written thereon, and the date of week ending stamped thereon at $f$, and also stamped thereon at $e$ the name of a town or station. The other card C² is printed in the same way except that instead of "Leave" it has "Arrive" printed at $d'$. It is stamped in the same way at $b$, $c$ and $f$ but is stamped with the name of another town or station at $e'$. The bus driver would insert the first card in the machine when leaving the first station and would operate the machine so that the card would be printed with the exact time of leaving and stored away inaccessible to anyone except a person authorized by the bus company to remove the cards. Then when arriving at the other station the driver would insert and print the other card. By having a card for each station on the road a complete record of the travel of a bus inaccessible to the driver after being made would thus be afforded for accurate superintendence for operation of the bus system.

In Figures 12 and 13 cards A³ and A⁴ are provided for keeping accurate time of work expended in a shop or factory. Both cards are printed for the job number, employee's name and number date of ending of the week when the card is used at $f$ and name of the employer at $g$. The two cards differ in that the card A³ has "Start" printed on it at $n$ and the other card A⁴ has "Completed" on it, at $m'$. These cards are made up both with the same job number stamped on them at $h$ and with the employee's name and number written on at $k$ and $m$ respectively. Upon starting the job the employee inserts the card A³ and stamps it in the machine and upon completing the job inserts the card A⁴ and stamps it in the machine; the cards being stored away and inaccessible to the employee for any alteration of the record, which is thus accurately produced for accurate time keeping by the shop or factory authorities.

It is believed that sufficient illustration of uses of the time recording machine have been given to indicate that many other uses of the machine may be made where it is essential to have an accurate time record of a transaction or incident which will be immediately inaccessible for any alterations by the person making it and is thereby completely under the control of an authority to whom the person making the record is responsible for the result of the incident or transaction the time of which is recorded.

The making of false records is especially provided against by the guard which automatically closes the entrance slot to the insertion of an additional card once operation is started upon an inserted card; and by the prevention of any return operation of the mechanism once it is started, until it has completed its entire cycle of operations which includes the printing of the card, its downward transfer and its rearward filing movement. Tampering with the machine is further prevented by the provisions in connection with the access door 283 as previously described.

The accuracy of the time record is insured notwithstanding the stoppage of the time printing wheels for an instant during the printing; this being doubly provided for by the lost motion taken up by the spring 23 near the clock 13, and by the lost motion taken up by the springs 37 at the gear 33. This will permit the clock to run ahead of the mechanism during the instant of stoppage but the springs will always restore the printing wheels to synchronism with the clock as soon as they are released where held at the ratchet wheels 64 and 69. While an electric clock is illustrated as controlling the machine, it will be understood that any suitable kind of spring clock or other clock mechanism may be employed for the same purpose.

Other modifications may occur in practice to suit different conditions or the desires of different users, and while I have rather specifically illustrated and described a certain preferred example of my invention herein, I do not wish to be understood as being limited to such precise disclosure, but what I claim as new and desire to secure by Letters Patent is:

1. In a recorder having variable marking means, a device comprising a member engaging an edge of a flat-faced record element, supporting the element to present its flat face to be marked by said marking means, said member being movable away from said marking means along the plane of the flat face of the element, means to compel movement of said supporting member and of said element therewith, away from said marking means, storage means, and means to remove the moved element from said supporting means and said movement compelling means to said storage means.

2. In a recorder having variable marking means, a device comprising a member engaging an edge of a flat-faced record element, supporting the element to present its flat face to be marked by said marking means, means operative to pierce said element, said member and said piercing means being movable away from said marking means along the plane of the flat face of the element, means to move said supporting member and said piercing means away from said marking means, storage means, and means operative when said member and means are moved away to remove the moved element from said supporting member and said piercing means to said storage means.

3. In a recorder having variable marking means, a device comprising a member engaging an edge of a flat-faced record element, supporting the element to present its flat face to be marked by said marking means, means operative to enforce the marking operation of the marking means, means operative incident to operation of the enforcing means to pierce said element, said member and said piercing means being movable away from said marking means along the plane of the flat face of the element, means to move said supporting member and said piercing means away from said marking means, storage means, and means operative when said member and means are moved away to remove the moved element from said supporting member and said piercing means to said storage means.

4. In a recording apparatus having a marking device, guides at opposite sides of said device for respective edges of a record element, into which the element is inserted to be marked by the device, a support contacting the advanced edge of the element, movable away from the marking device in the direction of insertion, means operative to engage the element to move it with the support, and means for releasing the element from the engaging means and forcing the element in broadside direction from said support, after said support has moved away from said marking means as aforesaid.

5. In a recording apparatus having a marking device, guides at opposite sides of said device for respective edges of a record element, into which the element is inserted to be marked by the device, a support contacting the advanced edge of the element, movable away from the marking device in the direction of insertion, means operative to engage the element to move it with the support, means for releasing the element from the engaging means and forcing the element in broadside direction from said support, after said support has moved away from said marking means as aforesaid, an actuating device having a cycle of operation, and mechanisms connected to said actuating device for enforcing, during said cycle of operation, in the order mentioned, the operations of said marking device and the engaging means, the movement of the support, and the operation of the releasing and removing means.

6. In a recording apparatus having a plurality of variably movable marking members and a device to move said members into a definite relation to each other, means to support a record element in position to be marked by said members, a device to enforce the marking, a device to move the support away from said marking members, a device operative to engage the record element for movement with the support, a device to remove the record element from the engaging means and the support, actuating means having a cycle of operation, and mechanisms connected to said actuating means for actuating the several devices in the order mentioned during the cycle of operation.

7. In a machine for making and filing records having a marking device, a holder movable to and from said device, receptive to a record element moved across said device, a piercing element movable on said holder, mechanism to enforce the marking operation of the marking device, comprising means moving said piercing element to pierce the record element, means withdrawing the piercing element after the holder has moved away from the marking device, means removing the record element from the moved-away holder, and means whereby said piercing element is held in its withdrawn position, upon return of the holder to the marking device, until the next succeeding piercing operation is to occur.

8. In a machine for making and filing records having a marking device, a holder movable to and from said device, a filing storage device, a member to force a record element from the holder to the storage device when the holder has been moved away from the marking device, a shaft, a member on said shaft operated on rotation of the shaft to move said holder away from said marking device, and then, upon continued rotation of the shaft, to hold the holder in moved-away position, and a member having a lost-motion connection to said shaft, operating said forcing means after the holder is held as aforesaid.

9. In a recorder having a movable marking member, means coupled to, and continuously tending to move said member, said coupling including a lost-motion connection with said member, mechanism producing marking operation of said member, devices comprised in said mechanism for, respectively, definitely locating said member, holding a record element in position to be marked, moving the marked record element away from said member, and storing the moved-away element, and actuating means enforcing the specified operations of the several devices during a single continued movement of said actuating means.

10. In combination with a guide member for contacting opposite edges of a card, a receptacle with an entrance opening between said guide members, forcing means movable in alternate directions into and out of said entrance, between the guide members, to flex the card from said guide members into said receptacle, means to feed the card along the guide means to a position opposite said entrance, and mechanism imparting alternate operations to said feeding means and said forcing means, to deliver cards successively to said receptacle.

11. In a recording and filing apparatus, means providing a definite path for a card with one edge following another along said path, and having an entrance at one end of said path, a filing device with an entrance at the opposite end of said path, receptive to the card when the card is moved in broadside direction from said path, means for marking the card near said one end of said path, a member operative along said path to feed the card from the marking means to the entrance of the filing device, and a member operative alternatively with the feeding mechanism, to push the card in said broadside direction into said filing device.

12. In a recording and filing apparatus, means providing a definite path for a card with one edge following another along said path, and having an entrance at one end of said path, a filing device with an entrance at the opposite end of said path, receptive to the card when the card is moved in broadside direction from said path, marking means near said one end of said path, a member operative along said path to feed the card from the marking means to the entrance of the filing device, a member operative alternatively with the feeding mechanism, to move the card in said broadside direction into said filing device, and operative connections from said shaft to the respective members, each having a period of inaction during a period of action of the other, to provide the alternative operation of the members incident to a continuous rotation of the shaft.

13. In a recorder, mechanism comprising a variable means for marking a record element, storage means for storing a record element, supporting means operative first to support the record element in position to be marked by said marking means and then to move said record element to a position where it is released to said storage means, and guarding means admitting the record element into said position to be marked, and then preventing access to the record element in said position and during its release to and occupancy of said storage means, and guarding means also preventing access to said mechanism.

14. In a recorder, mechanism comprising variable means for marking a record element, means for supporting a record element in position to be marked by the marking means and then to move it to a position for transfer to storing means, means for storing the marked record element, means for transferring the marked element to the storage means, and guarding means admitting the record element into said position to be marked, and then preventing access to the record element in said position and during its transfer to and occupancy of said storage means, and guarding means also preventing access to said mechanism.

15. In a recorder, mechanism comprising variable means for marking a record element, means for supporting a record element in position to be marked by said marking means and then to move it to a position for transfer to storing means, means for storing the marked record element, means for transferring the marked element to the storage means, and an enclosure for said mechanism and said supporting, transferring and storage means, having means to admit the record element into said position to be marked, and then to prevent access to the record element in said position and during its transfer to and occupancy of said storage means, said enclosure also preventing access to said mechanism.

16. In a machine for marking record elements, in which there are marking means, storage means and transfer means for said record elements together with actuating means therefor, an access means to said storage means and a closure therefor, a segment movable with said access means provided with means to limit the extent of opening thereof, and means preventing actuation of said actuating means except when said access means is in the closed position.

17. In a card-recording machine, a housing having an opening, a storage-receptacle in the housing, means including a vertically reciprocable carriage disposed for subjacently supporting the cards deposited through said opening and successively lowering the same to the receptacle for storage, and means for shifting successively lowered cards from the carriage into the receptacle.

18. In a card-recording and printing machine, a housing, a storage-receptacle in the housing spaced from and disposed below the printing-mechanism of the machine for receiving successively printed cards, means including a carriage disposed for reciprocatory travel in the housing for successively supporting the cards on edge for printing and for lowering the printed cards in upstanding position to the receptacle, and means including a reciprocatory pusher-arm for shifting successively lowered cards from the carriage in upstanding position into the receptacle.

19. In a card-recording machine, a housing having an opening, a storage-receptacle in the housing, a channel-way in the housing in registration with said opening, a carriage movable in the way for receiving cards successively deposited through said opening for edgewise supporting the same for delivery thereof in upstanding position to the receptacle, means for piercingly engaging the respective cards for retaining the same on the carriage during travel toward the receptacle and means for shifting successively delivered cards from the retaining means and carriage into the receptacle.

20. In a card-recording machine, a storage-receptacle, means including a traveling carriage for supporting a card on edge for delivery thereof in upstanding position to the receptacle, means for piercingly engaging the card for retaining the same on the carriage during travel toward the receptacle, and means for shifting successively delivered cards from the retaining means and carriage into the receptacle.

21. In a card-recording machine, a housing, a storage-receptacle within the housing, means including a carriage disposed for travel in the housing for delivering cards successively deposited in the housing to the receptacle, a door in the housing for affording access to the receptacle, and means for preventing operation of the carriage when the door is open.

22. In a card-recording machine, a housing, a storage-receptacle within the housing, means including a carriage disposed for travel in the housing for delivering cards successively deposited in the housing to the receptacle, means for shifting the successive cards from the carriage into the receptacle for storage, means including an operating member for sequentially actuating the carriage and the shifting means, a door in the housing for affording access to the receptacle, and means co-operable with the door for preventing actuation of the operating member when the door is open.

23. In a card-recording machine, a storage-receptacle, means including a horizontally disposed vertically reciprocable carriage for supporting a card on edge for delivery thereof in upstanding position to the receptacle, and means for piercingly engaging the card for retaining the same on the carriage during travel toward the receptacle.

ELMER G. STRECKFUSS.